(12) United States Patent
Flynn

(10) Patent No.: US 6,435,780 B1
(45) Date of Patent: Aug. 20, 2002

(54) ROTARY CUTTING TOOL

(75) Inventor: Clifford M. Flynn, Pittsfield, MA (US)

(73) Assignee: Talbot Holdings Ltd., Madison Heights, MI (US)

( * ) Notice: Subject to any disclaimer, the term of this patent is extended or adjusted under 35 U.S.C. 154(b) by 87 days.

(21) Appl. No.: 09/611,740

(22) Filed: Jul. 7, 2000

(51) Int. Cl.⁷ ................................................ B23C 5/10
(52) U.S. Cl. .......................... 407/53; 407/59; 407/63
(58) Field of Search .............................. 407/53, 54, 55, 407/56, 58, 59, 63; 408/228, 230

(56) References Cited

U.S. PATENT DOCUMENTS

| | | | |
|---|---|---|---|
| 2,129,417 A | | 9/1938 | Gase |
| 2,129,418 A | * | 9/1938 | Gase .......................... 407/53 |
| 2,377,329 A | * | 6/1945 | Dettmer ....................... 407/53 |
| 4,529,341 A | | 7/1985 | Greene |
| 4,645,389 A | | 2/1987 | Maier |
| 4,810,136 A | * | 3/1989 | Paige .......................... 407/54 |
| 4,963,059 A | | 10/1990 | Hiyama |
| 5,049,009 A | * | 9/1991 | Beck et al. .................... 407/54 |
| 5,141,369 A | | 8/1992 | Palace |
| 5,190,420 A | | 3/1993 | Kishimoto et al. |
| 5,236,291 A | * | 8/1993 | Agapiou et al. ............. 408/211 |
| 5,273,380 A | * | 12/1993 | Musacchia ................... 408/230 |
| 5,322,394 A | | 6/1994 | Okanishi et al. |
| 5,609,447 A | | 3/1997 | Britzke et al. |
| 5,779,399 A | | 7/1998 | Kuberski |
| 5,855,458 A | | 1/1999 | Reynolds |
| 6,618,355 | * | 1/2001 | Wardell ....................... 407/54 |

FOREIGN PATENT DOCUMENTS

| | | |
|---|---|---|
| EP | 0 352 224 A1 | 1/1990 |
| GB | 787036 | 11/1957 |

* cited by examiner

Primary Examiner—Henry Tsai
(74) Attorney, Agent, or Firm—John W. Gregg

(57) ABSTRACT

An improved end milling tool effective to reduce forces produced in ramp cutting comprises a plurality of end cutting edges, and a plurality of side cutting edges, each end cutting edge lying parallel to a radius of the tool tip and intersecting a side cutting edge at the periphery of the tool tip, and each end cutting edge comprising a peripheral end edge portion and an interior edge portion, the peripheral end edge portion sloping relatively shallowly from the tip periphery towards the shank portion of the tool, and the interior edge portion sloping relatively steeply from the peripheral edge portion towards the shank portion.

6 Claims, 4 Drawing Sheets

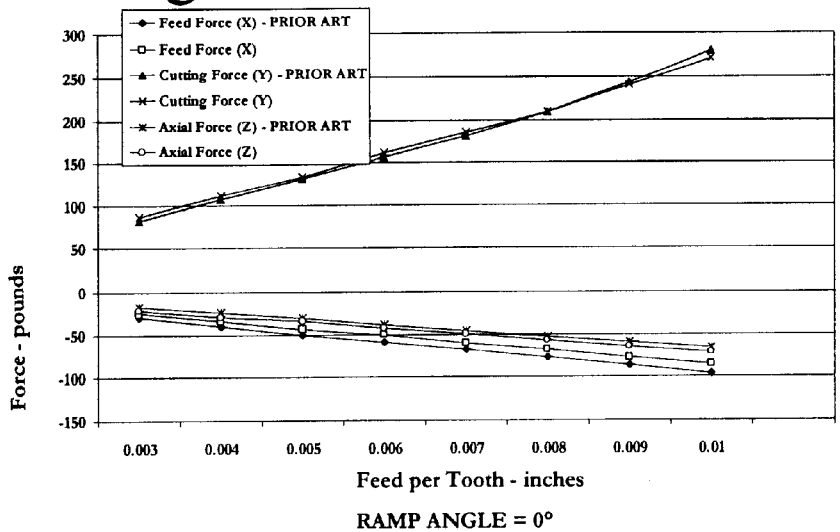
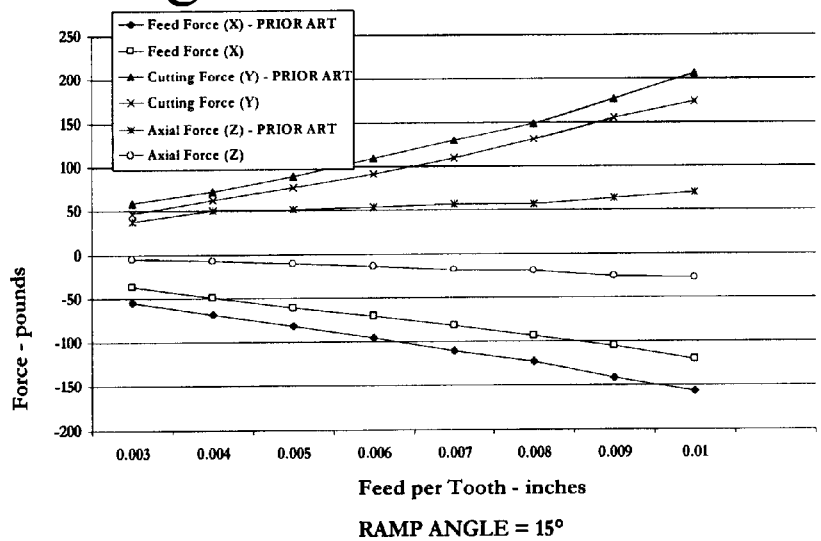

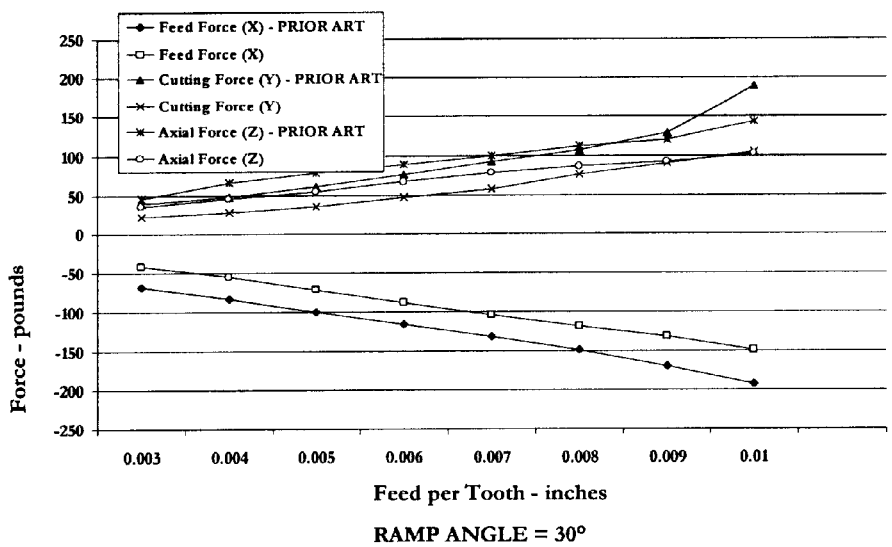
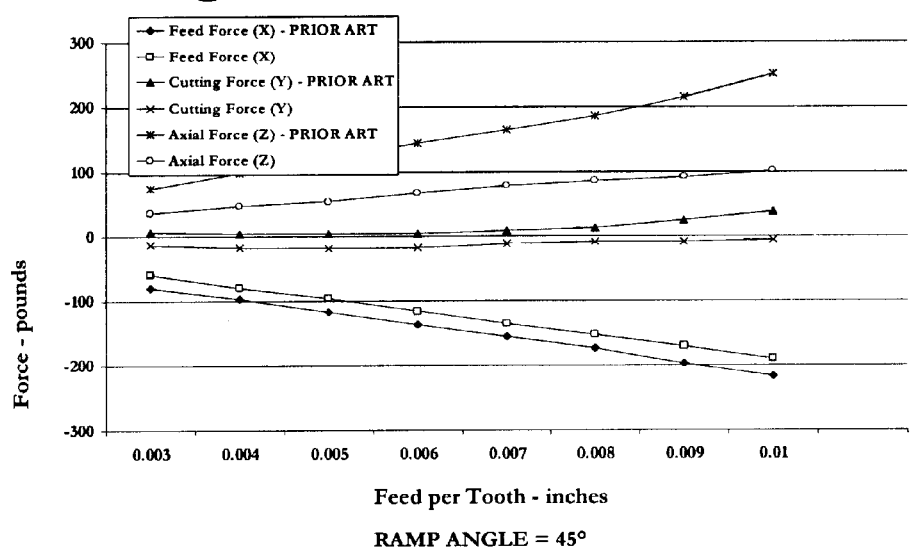

ROTARY CUTTING TOOL

BACKGROUND OF THE INVENTION

I. Field of the Invention

This invention relates to rotating cutting tools. In particular, this invention relates to end milling tools, and most particularly to end milling tools providing improved performance for cutting while being advanced simultaneously in the direction of the tool longitudinal axis (infeed), and in a direction transverse to the tool longitudinal (translational feed), such simultaneous feed known as "ramp feed".

II. Description of Related Art

End mills are generally cylindrically shaped cutting tools comprising a body portion and shank portion, the body portion including cutting edges and the shank portion typically comprising surfaces for retention by a tool rotating device. Typically, the body portion comprises a tip or end comprising end cutting edges, and a cutting length comprising a plurality of flutes defining side cutting edges terminating at the tip. Known end mills may have straight or helical flutes, and may have two, three, four or more flutes and two, three, four, or more end cutting edges. It is known to arrange end cutting edges to lie along radii at the tip and to provide channels or gashes in the tip inter-spaced with end cutting edges and continuous between the tip circumference and the interior of the tip proximate the tip center. Further, it is known to have end cutting edges lie in planes oblique to the tool longitude and sloping at relatively shallow angles from the tool periphery toward the tip center.

U.S. Pat. No. 2,129,417 discloses an end mill having an arcuate depression in the tip end interiorly of the end cutting edges such that the end cutting edges are of relatively short effective length and are well supported by the sloping sides of the arcuate depression. The end mill disclosed is described as having improved resistance to chipping of the end cutting edges.

U.S. Pat. No. 5,049,009 discloses an end mill wherein end cutting edge portions, lying parallel to radii at the tip, slope shallowly inwardly from the tip periphery toward the shank end and intersect at the tip center. A primary land (referred to as a "first back-off surface") lies between each end cutting edge portion and a relief surface intersecting trailing side non-cutting surfaces.

U.S. Pat. No. 5,779,399 discloses an end mill wherein only one end cutting edge lies along a radius at the tip and extends from the periphery through the tip center. As shown in this reference, relief is provided in the tip end behind the end cutting edge and between the end cutting edge and a sidewall of a gash. The end cutting edge of this reference lies in a plane perpendicular to the tool longitude.

Known end mills tend to chatter during ramp feeding at nominal feed rates because of the relatively high forces acting on the trailing side of the tip end. To avoid tool chatter, it is conventional to reduce feed rates below nominal values during ramp feeding. Consequently, there is a need for an end mill providing improved cutting performance during ramp feeding, particularly exhibiting reduced chatter inducing forces and allowing feed at nominal feed rates.

SUMMARY OF THE INVENTION

It is an object of the present invention to provide an end mill exhibiting free cutting in ramp feeding whereby forces are reduced.

It is a further object of the present invention to provide an end mill providing improved delivery of coolant to the end cutting edge.

Further objects and advantages of the invention shall be made apparent from the accompanying drawings and the following description thereof.

In accordance with the aforesaid objects, the present invention provides an end mill wherein end cutting edges parallel radii of the tip and lie along primary and secondary slopes from the tool periphery inwardly. The primary slope is relatively shallow and over a relatively short portion of the cutting edge, the secondary slope is relatively steep and extends over the greater portion of the end cutting edge. The tip includes a land adjacent each end cutting edge and the primary slope provides relief in this land behind the peripheral edge of the land. The secondary slope promotes delivery of coolant proximate the primary slope and evacuation of chips from the cutting zone.

BRIEF DESCRIPTION OF THE DRAWINGS

FIG. 4 is a first graph of measured forces from cutting tests of tools in accordance with the invention and tools in accordance with the prior art.

FIG. 5 is a second graph of measured forces from cutting tests of tools in accordance with the invention and tools in accordance with the prior art.

FIG. 6 is a third graph of measured forces from cutting tests of tools in accordance with the invention and tools in accordance with the prior art.

FIG. 7 is a fourth graph of measured forces from cutting tests of tools in accordance with the invention and tools in accordance with the prior art.

DETAILED DESCRIPTION OF THE PREFERRED EMBODIMENT

Figure 1:
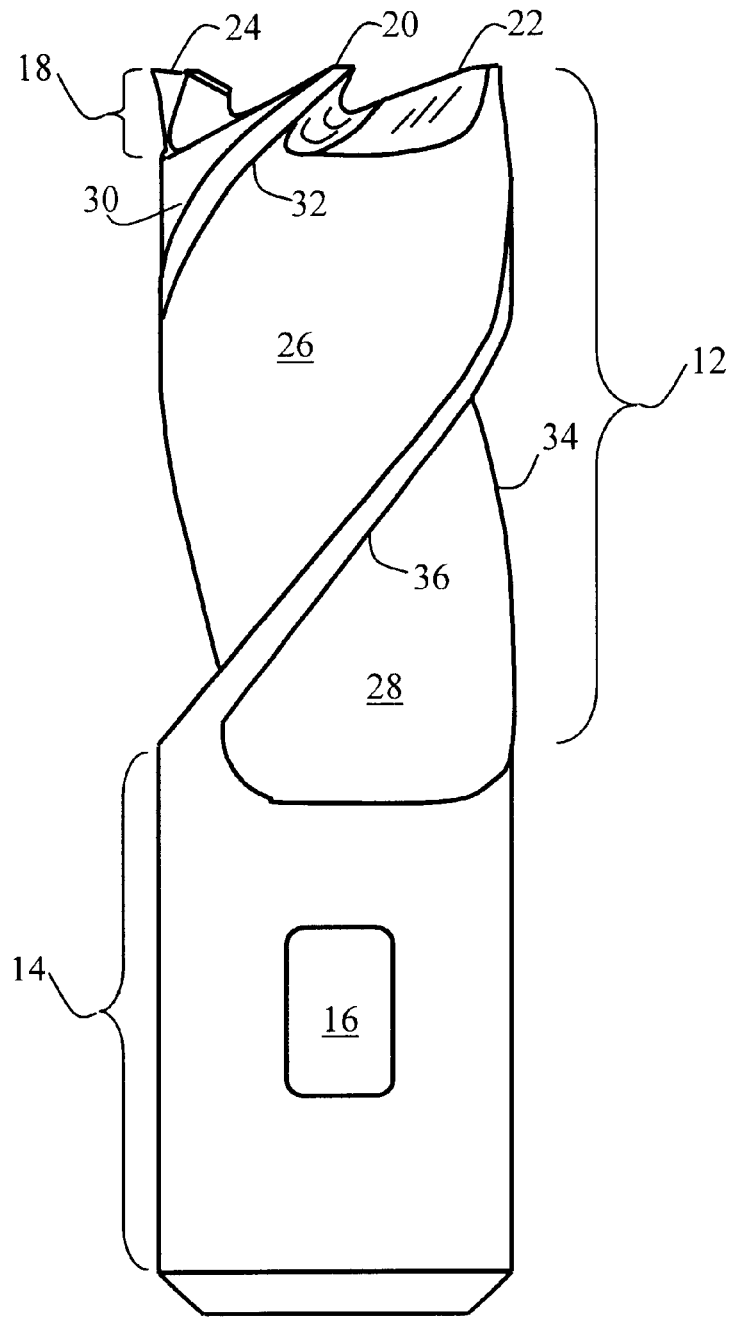
FIG. 1 is a side view of an end mill in accordance with the invention.
Figure 2:
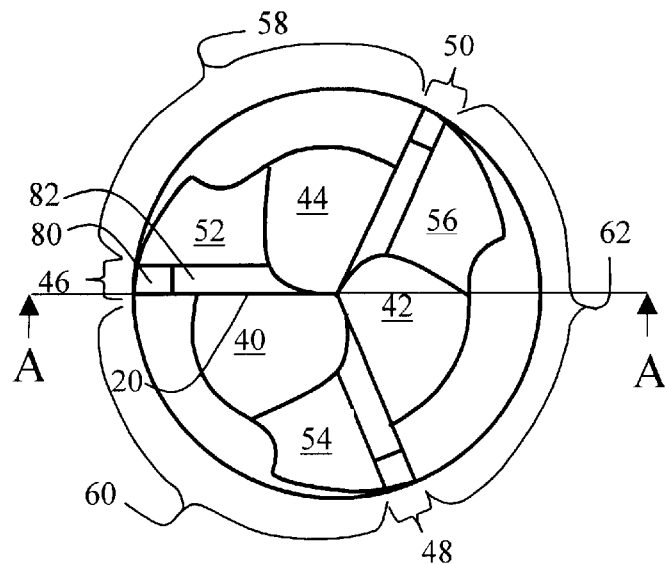
FIG. 2 is a top view of the tip end of the end mill of FIG. 1.

Referring to FIG. 1, tool 10 comprises a cutting portion 12 and a shank portion 14. Shank portion 14 may include surface features such as flat 16 for securing the shank portion in a device for rotating tool 10. Cutting portion 12 terminates in a tip end 18 comprising end cutting edges 20, 22, and 24 (FIG. 2). Cutting portion 12 includes helical flutes 26, 28 and 30 in the circumference thereof. While three helical flutes are depicted in FIG. 1, cutting tools in accordance with the invention may include two or more flutes. Flutes 26, 28 and 30 define side cutting edges 32, 34, and 36, the flutes and side cutting edges shown being helical. Contours of flutes 26, 28 and 30 undercut the periphery of cutting portion 12 to produce positive cutting geometry at the cutting edges 32, 34 and 36.

Referring to FIG. 2, inter-spaced with end cutting edges 20, 22, and 24 are channels, or gashes 40, 42 and 44. Gashes 40, 42 and 44 intersect the periphery of tool 10 and continue inwardly toward the center of tip 18. The bottom contour of each of gashes 40, 42 and 44 slopes from the periphery of tool 10 away from shank portion 14 toward the tip center. Typically, gashes 40, 42 and 44 undercut, respectively, end cutting edges 20, 22, and 24 to produce positive cutting geometry at the cutting edges 20, 22, and 24. Adjoining cutting edges 20, 22 and 24 are primary lands 46, 48, and 50. Between, respectively, lands 46, 48 and 50 and gashes 40, 42 and 44, are relief surfaces 52, 54, and 56. Relief surfaces 52, 54, and 56 are planar, sloping towards the shank end from, respectively, lands 46, 48 and 50 to non-cutting segments 58, 60, and 62 of cutting portion 12.

Figure 3:
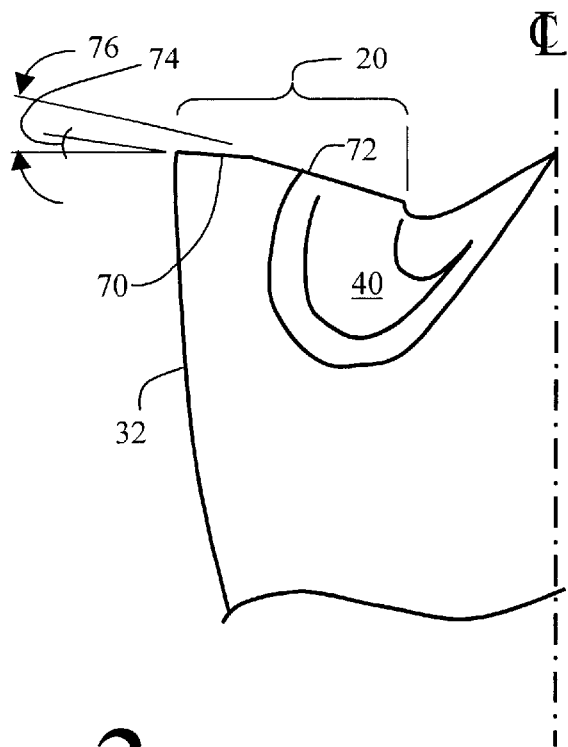
FIG. 3 is a partial section of a cutting portion of the cutting tool taken along lines A—A of FIG. 2.

A side view of cutting edge 32 and end cutting edge 20 are shown in FIG. 3. As seen in FIG. 3, end cutting edge 20 intersects helical cutting edge 32 at the periphery of tip portion 18. Likewise, end cutting edges 22 and 24 intersect helical cutting edges 36 and 34, respectively. As shown in FIG. 3, each end cutting edge comprises two portions, a peripheral end edge portion, and interior edge portion, in the case of end cutting edge 20, peripheral end edge portion 70 and interior edge portion 72. Peripheral end edge portion 70 slopes relatively shallowly toward shank portion 14 from the tool periphery to interior edge portion 72. Angle 74, defining the slope of peripheral end edge portion 70, is typically 2–5 degrees, preferably greater than 2 and less than 4.5, most preferably between 3 and 4 degrees. Interior edge portion 72 slopes relatively steeply toward shank portion 14 from end edge portion 70 to intersection with gash 46. Angle 76, defining the slope of interior portion 72 is in the range of 5–25 degrees, preferably 10–20 degrees. Preferred slopes include 12–18 degrees. Land 46, adjoining cutting edge 20, also comprises two portions, peripheral end land portion 80, and interior land portion 82 (FIG. 2).

The combination of shallowly sloped end cutting edges and gashes of conventional end mills leaves substantial central portions where forces tend to push the tip center off the axis of rotation of the tool. The combination of gashes and relatively steep sloping interior end edge portions of end milling tools according to the invention provides relief proximate the center of tip 18, reducing forces tending to drive the tip center off the axis of rotation of the tool. Due to the reduction in forces, the feed rate can be increased, allowing faster cutting. Further, the steep sloping interior end edge portions allow heat to escape from the cutting edge workpiece interface and allow coolant to contact this interface for lubrication and cooling.

Cutting tests were made comparing performance of tools in accordance with the invention and like tools wherein the end cutting edges were singly sloped from the tool periphery to their interior terminations. The tools tested were three fluted, carbide end mills, 0.50 inch cutting diameter, with three end cutting edges. Cutting tests were performed on a workpiece of 6061T85 aluminum, the tool being rotated at 3500 rpm, and driven along ramps of selected angles at a depth of cut of 0.50 inches, and a width of cut of 0.25 inches. Feedrates were varied to vary the feed per tooth of the tip cutting edges from 0.003 inches to 0.01 inches (workpieces were pre-machined with the appropriate ramp angle to produce constant depth of cut). During the cutting tests, forces along three orthogonal axes were measured using a three axis strain gauge dynamometer and the measured forces plotted to produce the test results illustrated in the graphs of FIGS. 4–7 (negative values reflect the direction of the measured force along the identified axis). Cutting associated with measurements appearing in FIG. 4 was performed at a ramp angle of zero degrees. Cutting associated with measurements appearing in FIG. 5 was performed at a ramp angle of fifteen degrees. Cutting associated with measurements appearing in FIG. 6 was performed at a ramp angle of 30 degrees. Cutting associated with measurements appearing in FIG. 7 was performed at a ramp angle of 45 degrees.

Referring to FIGS. 4–7, it is seen that tools in accordance with the invention exhibited reduced force in all directions as compared to forces associated with cutters in accordance with the prior art, i.e., lacking the relatively steeply inclined interior portion of the end cutting edges. With increased ramp angle, the reduction of forces exhibited by cutters according to the invention increased.

While the invention has been illustrated with reference to a preferred embodiment, and the preferred embodiment has been described in considerable detail, it is not the intention of the inventors to limit the invention to such details. Rather, it is intended that the invention be defined by the appended claims and all equivalents thereof.

What is claimed is:

1. An improved rotary cutting end mill having a shank portion and a cutting portion, the cutting portion comprising a plurality of side cutting edges on the circumference thereof, each side cutting edge defined by a flute formed in the circumference, and terminating in a tip comprising a plurality of end cutting edges, each end cutting edge extending radially outward from the axis of rotation of the end mill to the periphery of the tip and thereat intersecting a side cutting edge and comprising a peripheral end edge portion at the intersection with a side cutting edge and an interior edge portion interiorly from the peripheral end edge portion, the peripheral end edge portion sloping shallowly from the tip periphery towards the shank portion, and the interior edge portion sloping relatively steeply from the peripheral end edge portion towards the shank portion.

2. The improved rotary cutting end mill of claim 1 wherein the tip further comprises a plurality of primary lands, each primary land adjoining a respective end cutting edge and comprising a peripheral end land portion adjoining the peripheral end edge portion and an interior land portion adjoining the interior edge portion.

3. The improved rotary cutting end mill of claim 2 wherein the tip further comprises a plurality of relief surfaces, each relief surface adjoining a respective primary land and sloping therefrom towards the shank portion to intersection with a non-cutting segment of the cutting portion circumference.

4. The improved rotary cutting end mill of claim 3 wherein the tip further comprises a plurality of channels, each channel continuous from a non-cutting segment of the cutting portion to a terminus proximate the tip center and adjoining a respective relief surface and intersecting a respective interior edge portion.

5. The improved rotary cutting end mill of claim 1 wherein the peripheral end edge portion slopes at an angle in the range of 2–5 degrees.

6. The improved rotary cutting end mill of claim 5 wherein the interior edge portion slopes at an angle in the range of 5–25 degrees.

* * * * *